United States Patent
Chang et al.

(10) Patent No.: US 10,234,283 B2
(45) Date of Patent: Mar. 19, 2019

(54) BINOCULARS RANGEFINDER

(71) Applicants: Sintai Optical (Shenzhen) Co., Ltd., Shenzhen, Guandong Province (CN); Asia Optical International Ltd., Tortola (GB)

(72) Inventors: Zhang-Ming Chang, Taichung (TW); Hua-Tang Liu, Taichung (TW); Yue-Ye Chen, Shenzhen (CN); Zhi-Wei Gao, Shenzhen (CN); Shang Luo, Shenzhen (CN)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 581 days.

(21) Appl. No.: 14/967,473

(22) Filed: Dec. 14, 2015

(65) Prior Publication Data

US 2016/0187131 A1   Jun. 30, 2016

(30) Foreign Application Priority Data

Dec. 29, 2014   (CN) .......................... 2014 1 0842756

(51) Int. Cl.
*G01C 3/04* (2006.01)
*G01S 7/481* (2006.01)
(Continued)

(52) U.S. Cl.
CPC .............. *G01C 3/04* (2013.01); *G01S 7/4813* (2013.01); *G01S 7/4814* (2013.01);
(Continued)

(58) Field of Classification Search
CPC ....... G01C 3/04; G01S 7/4814; G01S 7/4816; G01S 7/4813
See application file for complete search history.

(56) References Cited

U.S. PATENT DOCUMENTS 5,262,838 A * 11/1993 Tocher ..................... G01C 3/04
356/16
7,999,924 B2 * 8/2011 Watanabe ................. G01C 3/04
356/3.01

(Continued)

FOREIGN PATENT DOCUMENTS

CN   201637925 U   11/2010
CN   201852572 U   6/2011
(Continued)

*Primary Examiner* — Eric L Bolda
(74) *Attorney, Agent, or Firm* — McClure, Qualey & Rodack, LLP

(57) ABSTRACT

A binoculars rangefinder includes a central shaft, two eyepieces, two objective lenses, two prism modules, an optical transmitter, and an optical receiver. The eyepieces are disposed on two sides of the central shaft, allowing a first light beam reflected by an object to pass therethrough. The objective lenses are disposed on the two sides of the central shaft. The prism modules are disposed between the eyepieces and objective lenses. The optical transmitter is configured to emit a second light beam to the object. The optical receiver is configured to receive the second beam which is reflected by the object.

10 Claims, 5 Drawing Sheets

(51) Int. Cl.
    *G01S 17/08* (2006.01)
    *G02B 23/14* (2006.01)
(52) U.S. Cl.
    CPC ............ *G01S 7/4816* (2013.01); *G01S 17/08* (2013.01); *G02B 23/14* (2013.01)

(56) References Cited

U.S. PATENT DOCUMENTS

| | | | |
|---|---|---|---|
| 8,149,507 B2* | 4/2012 | Heintz | F41G 3/02 |
| | | | 359/399 |
| 9,097,892 B2* | 8/2015 | Bach | G02B 5/04 |
| 2009/0091821 A1* | 4/2009 | Regan | G02B 5/208 |
| | | | 359/351 |
| 2017/0074650 A1* | 3/2017 | Mrl K | G01C 3/04 |

FOREIGN PATENT DOCUMENTS

| | | |
|---|---|---|
| JP | 200445470 A | 2/2004 |
| TW | 200636214 A | 10/2006 |

\* cited by examiner

BINOCULARS RANGEFINDER

BACKGROUND OF THE INVENTION

Field of the Invention

The invention relates to a rangefinder, and more particularly to a binoculars rangefinder.

Description of the Related Art

A conventional rangefinder allows a user to observe and aim at an object with only one eye, and the other eye must be closed. The user may feel uncomfortable after closing the other eye for a long period.

To solve the problem described above, a binoculars rangefinder is developed such as the binoculars rangefinder disclosed in U.S. Pat. No. 8,149,507B2. A user can observe and aim at an object by both eyes through the binoculars. However, the binoculars rangefinder disclosed in U.S. Pat. No. 8,149,507B2 uses Abbe-König Prism and thus the optical path extending from the measured object to the reticle of the binoculars and the optical path extending from the reticle to the user's eyes are not coaxial (not in a line).

BRIEF SUMMARY OF THE INVENTION

An object of the invention is to provide a binoculars rangefinder through which a user can observe and aim at a measured object by both eyes, and the measured object, a reticle of the binoculars rangefinder and the user's eyes are arranged in a line.

The binoculars rangefinder in accordance with an exemplary embodiment of the invention includes a central shaft, two eyepieces, two objective lenses, two prism modules, an optical transmitter, and an optical receiver. The eyepieces are disposed on two sides of the central shaft, allowing a first light beam reflected by an object to pass therethrough. The objective lenses are disposed on the two sides of the central shaft. The prism modules are disposed between the eyepieces and objective lenses. The optical transmitter is configured to emit a second light beam to the object. The optical receiver is configured to receive the second beam which is reflected by the object. Each of the prism modules includes a first prism, a second prism, a third prism and an optical multi-layer film disposed between the first prism and the second prism. The optical multi-layer film allows the second light beam to pass therethrough and reflects the first light beam. When entering the first prism along a first axis, the first light beam is totally reflected by the first prism and reflected by the optical multi-layer film, leaves the first prism, enters the third prism, is totally reflected by the third prism, and leaves the third prism along the first axis. When entering the first prism along the first axis, the second light beam is totally reflected by the first prism, leaves the first prism, passes through the optical multi-layer film, enters the second prism, is totally reflected by the second prism, and leaves the second prism along a second axis.

In another exemplary embodiment, the third prism is a roof prism.

In yet another exemplary embodiment, the first prism includes a first surface, a second surface and a third surface. The second prism includes a fourth surface, a fifth surface facing the third surface and a sixth surface. The third prism includes a seventh surface facing the second surface, an eighth surface, a first roof surface and a second roof surface. The optical multi-layer film is disposed between the third surface and the fifth surface.

In another exemplary embodiment, the third surface is attached to the fifth surface by adhesive.

In yet another exemplary embodiment, the first light beam is visible light, and the second light beam is an infrared ray.

In another exemplary embodiment, the optical transmitter includes a semiconductor laser, and the optical receiver includes an avalanche photodiode or a photodiode.

In yet another exemplary embodiment, the binoculars rangefinder further includes two transmissive liquid crystal displays disposed between the eyepieces and the prism modules.

In another exemplary embodiment, the binoculars rangefinder further includes two organic light emitting diodes disposed between the eyepieces and the prism modules.

In yet another exemplary embodiment, the binoculars rangefinder further includes two flat glass plates disposed between the eyepieces and the prism modules.

In another exemplary embodiment, the binoculars rangefinder further includes two focusing lenses disposed between the eyepieces and the prism modules.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
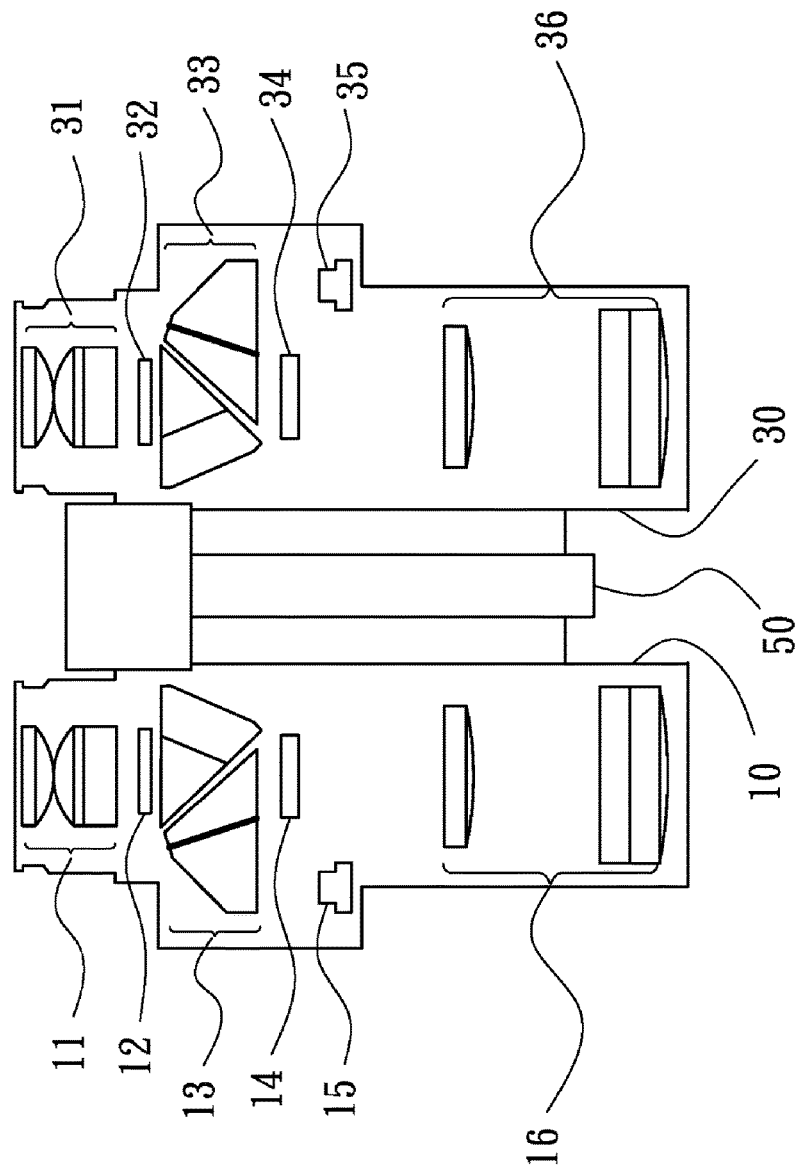
FIG. 1A depicts a cross section of an embodiment of a binoculars rangefinder of the invention.

Referring to FIG. 1A, binoculars rangefinder 100 includes a transmitting barrel 10, a receiving barrel 30 and a central shaft 50. The transmitting barrel 10 and the receiving barrel 30 are connected to the central shaft 50. The transmitting barrel 10 houses an eyepiece 11, a flat glass plate 12, a prism module 13, a focusing lens 14, a semiconductor laser 15 and an objective lens 16. The receiving barrel 30 houses an eyepiece 31, a flat glass plate 32, a prism module 33, a focusing lens 34, an avalanche photodiode (APD) 35 and an objective lens 36. The eyepiece 11 and the eyepiece 31 are disposed on two opposite sides of the central shaft 50 and symmetrical with respect to the central shaft 50. Similarly, the flat glass plate 12 and the flat glass plate 32, the prism module 13 and the prism module 33, the focusing lens 14 and the focusing lens 34 are disposed on two opposite sides of the central shaft 50 and symmetrical with respect to the central shaft 50 respectively.

Figure 1B:
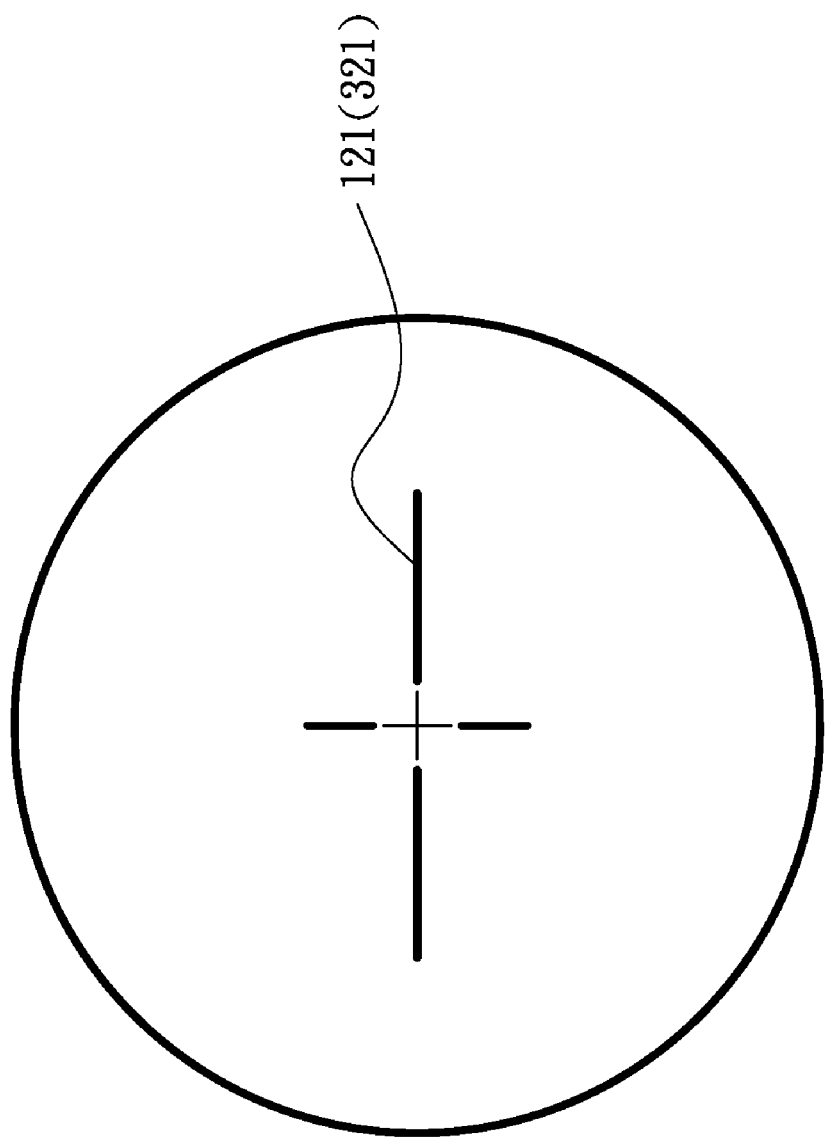
FIG. 1B depicts a flat glass plate and a reticle of the binoculars rangefinder of FIG. 1A.

The eyepiece 11 and the eyepiece 31, the flat glass plate 12 and the flat glass plate 32, the prism module 13 and the prism module 33, the focusing lens 14 and the focusing lens 34 constitute a telescope system of the binoculars rangefinder 100. A user can observe a measured object (not shown) through the eyepieces 11 and 31. The distance between the eyepieces 11 and 31 can be adjusted through rotation of the transmitting barrel 10 and the receiving barrel 30 with respect to the central shaft 50. The flat glass plates 12 and 32 have reticles 121 and 321 (as shown in FIG. 1B) respectively for aiming at the measured object. The focusing lenses 14 and 34 are movable so that a distance between the focusing lens 14 and the objective lens 16 and a distance between the focusing lens 34 and the objective lens 36 are adjustable for focusing.

The semiconductor laser 15, the prism module 13, the focusing lens 14 and the objective lens 16 constitute an emitting system of the binoculars rangefinder 100. The avalanche photodiode 35, the prism module 33, the focusing lens 34 and the objective lens 36 constitute a receiving system of the binoculars rangefinder 100. When the binoculars rangefinder 100 is used for distance measurement, a user observes a measured object (not shown) through the eyepieces 11 and 31 and aims at the measured object through the reticles 121 and 321 (as shown in FIG. 1B). The semiconductor laser 15 emits an infrared ray which passes through the prism module 13, the focusing lens 14 and the objective lens 16 to reach the measured object. The measured object reflects the infrared ray, and the reflected infrared ray returns to binoculars rangefinder 100 and passes through the objective lens 36, the focusing lens 34 and the prism module 33 and is finally received by the avalanche photodiode 35. The distance of the measured object is thereby calculated.

The structure of the prism module 33 and the optical paths of the visible light and infrared ray passing through the prism module 3 are described in sequence in the following.

Figure 2A:
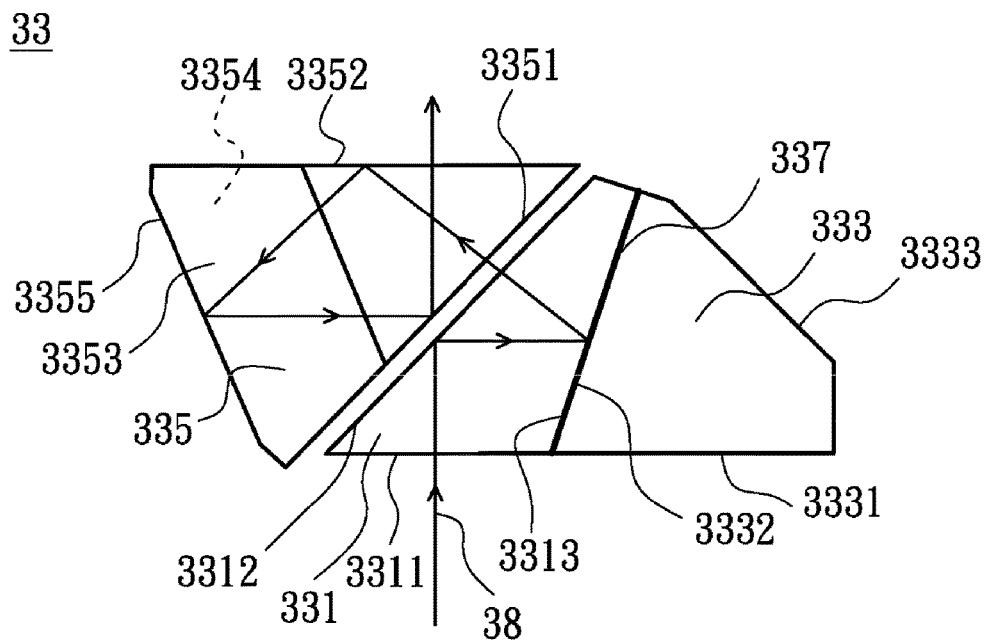
FIG. 2A is a schematic view of an optical path of visible light passing through prism modules of FIG. 1A.
Figure 2B:
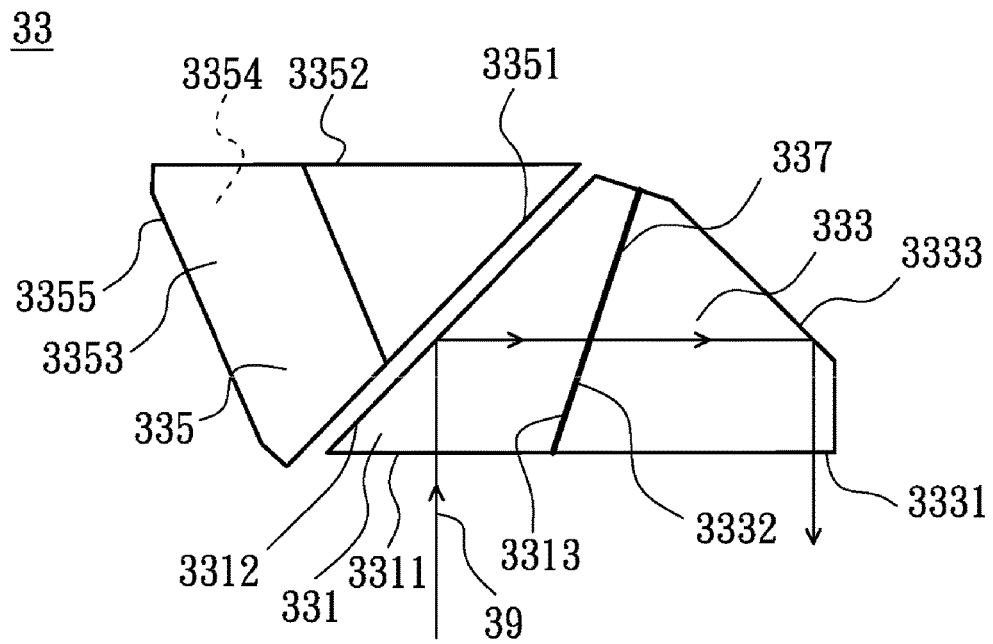
FIG. 2B is a schematic view of an optical path of an infrared ray passing through prism modules of FIG. 1A.

Referring to FIGS. 2A and 2B, the prism module 33 includes a first prism 331, a second prism 333, a third prism 335 and an optical multi-layer film 337. The first prism 331 includes a first surface 3311, a second surface 3312 and a third surface 3313. The second prism 333 includes a fourth surface 3331, a fifth surface 3332 and a sixth surface 3333. The third prism 335 includes a seventh surface 3351, an eighth surface 3352, a first roof surface 3353 and a second roof surface 3354. The first roof surface 3353 and the second roof surface 3354 are connected at a roof edge 3355. The seventh surface 3351 faces the second surface 3312, and the fifth surface 3332 faces the third surface 3313. The optical multi-layer film 337 is disposed between the third surface 3313 and the fifth surface 3332. The optical multi-layer film 337 only allows an infrared ray to pass therethrough, while the visible light is reflected by the optical multi-layer film 337. The third surface 3313 is attached to the fifth surface 3332 by adhesive.

When visible light 38 enters the first prism 331, the visible light passes through the first surface 3311 and is totally reflected by the second surface 3312. The reflected visible light 38 travels to the third surface 3313 and the optical multi-layer film 337. Since the optical multi-layer film 337 only allows the infrared ray to pass through and reflects the visible light, the visible light 38 is reflected by the optical multi-layer film 337 to the second surface 3312 and passes through the second surface 3312 to leave the first prism 331 and enter the third prism 335. The visible light 38 passes through the seventh surface 335 1and is totally reflected by the eighth surface 3352, the roof edge 3355 and the seventh surface 3351. The visible light 38 passes through the eighth surface 3352 to leave the third prism 335. The visible light 38 enters the prism module 33 and leaves the prism module 33 in the same direction and along the optical axes arranged in a line.

Referring to FIG. 2B, when entering the first prism 331, an infrared ray 39 passes through the first surface 3311 and is totally reflected by the second surface 3312. The reflected infrared ray 39 travels to the third surface 3313 and the optical multi-layer film 337. Since the optical multi-layer film 337 only allows the infrared ray to pass through, the infrared ray 39 passes through the third surface 3313 and the optical multi-layer film 337 to enter the second prism 333. The infrared ray 39 entering the second prism 333 passes through the fifth surface 3332 and is totally reflected by the sixth surface 3333. The infrared ray 39 passes through the fourth surface 3331 to leave the second prism 333. The infrared ray 39 enters and leaves the prism module 33 in opposite directions and along the optical axes not arranged in a line.

The third prism 335 is a roof prism in this embodiment, such as a Pechan prism.

When entering the prism module 33 through the first surface 3311, the visible light 38 and the infrared ray 39 are split by the prism module 33 to travel in different directions. The visible light 38 leaves the prism module 33 through the eighth surface 3352 in the same direction as it enters the prism module 33. However, the infrared ray 39 leaves the prism module 33 through the fourth surface 3331 in an opposite direction from the direction in which it enters the prism module 33. In another embodiment, the infrared ray 39 enters the prism module 33 through the fourth surface 3331 and leaves the prism module 33 through the first surface 3311 in an opposite direction from the direction in which it enters the prism module 33. The visible light 38 enters the prism module 33 through the first surface 3311 and leaves the prism module 33 through the eighth surface 3352 in the same direction as it enters the prism module 33.

In this embodiment, the prism module 13 and the prism module 33 have the same structure and are symmetrically disposed with respect to the central shaft 50. Thus, the optical paths along which the visible light and infrared ray pass through the prism module 13 are similar to the optical paths along which the visible light and infrared ray pass through the prism module 33. Therefore, descriptions for the prism module 33 are omitted.

Figure 3:
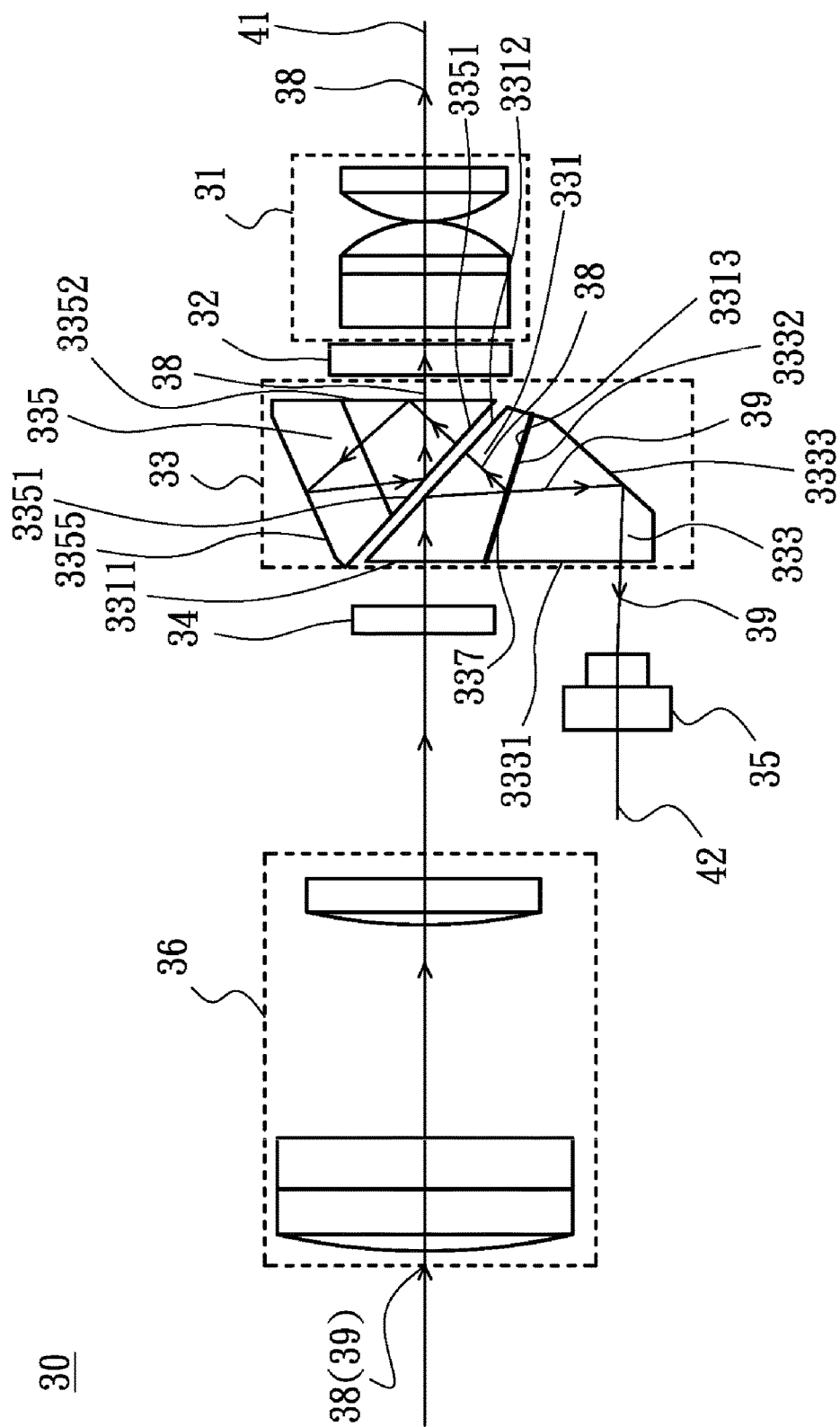
FIG. 3 depicts optical paths of the visible light and infrared ray in a receiving barrel of FIG. 1A.

Referring to FIG. 3, the measured object reflects the visible light and infrared ray to the binoculars rangefinder 100. When reflected by the measured object to the receiving barrel 30, the visible light 38 and the infrared ray 39 passes through the objective lens 36 and the focusing lens 34 along a first axis 41 and enters the prism module 33 through the first surface 3311. The infrared ray 39 is totally reflected by the second surface 3312 to pass through the third surface 3313, the optical multi-layer film 337 and the fifth surface 3332. The infrared ray 39 is totally reflected by the sixth surface 3333 and leaves the prism module 33 through the fourth surface 3331. The infrared ray 39 travels along a second axis 42 and is received by the avalanche photodiode 35. The visible light 38 is totally reflected by the second surface 3312 and afterwards reflected by the optical multi-layer film 337. The visible light 38 leaves the prism module 33 through the second surface 3312 and enters the third prism 335 through the seventh surface 3351. The incident visible light 38 is totally reflected by the eighth surface 3352, the roof edge 3355 and the seventh surface 3351 and leaves the third prism 335 through the eighth surface 3352. The visible light 38 travels along the first axis to pass through the flat glass plate 32 and the eyepiece 31. A user can observes an image of the measured object through the eyepiece 31.

Since the optical paths of the visible light and infrared ray in the transmitting barrel 10 are similar to the optical paths in the receiving barrel 30 shown in FIG. 1A, the optical paths in the transmitting barrel 10 are not depicted by a figure. Rather, the optical paths in the transmitting barrel 10 are described only in texts as follows. Referring to FIG. 1A, the infrared ray emitted from the semiconductor laser 15 enters the prism module 13 through the fourth surface and leaves the prism module 13 through the first surface. The infrared ray passes through the focusing lens 14 and the objective lens 16 to reach the measured object. The measured object reflects the infrared ray back to the binoculars rangefinder 100 and the infrared ray enters the receiving barrel 30. Also, the visible light is reflected by the measured object to enter the transmitting barrel 10. The visible light passes through the objective lens 16 and the focusing lens 14 to enter the prism module 13 through the first surface. The visible light leaves the prism module 13 through the eighth surface and afterwards passes through the flat glass plate 12 and the eyepiece 11, whereby a user can view an image of the measured object through the eyepiece 11.

FIG. 3 shows that the optical path extends through the flat glass plate 32 (or the reticle of FIG. 1B) and the eyepiece 31 to the user's eyes. That is, the measured object, the reticle and the user's eyes are arranged in a line. Therefore, the user is able to aim at the measured object with the reticle (see FIG. 1B) without the necessity of regulating the reticle.

Figure 4:
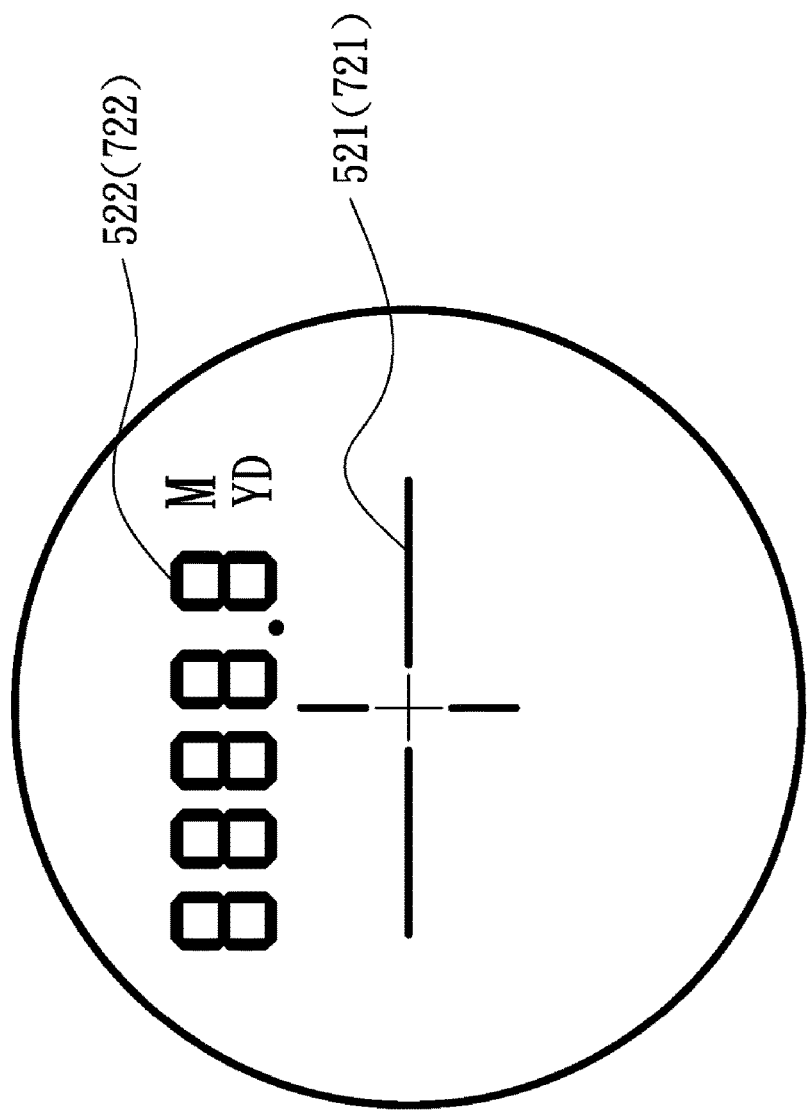
FIG. 4 depicts an image observed through a transmissive liquid crystal display or an organic light emitting diode.

It is understood that the flat glass plates 12 and 32 can be replaced with transmissive liquid crystal displays or organic light emitting diodes. The cross section of the binoculars rangefinder using the transmissive liquid crystal display (or organic light emitting diode) and the corresponding optical paths of the visible light and infrared ray are not depicted by figures because they are similar to those shown in FIGS. 1A and 3. The difference therebetween is that the transmissive liquid crystal display or organic light emitting diode is able to show distance values 522 and 722 (as shown in FIG. 4) in addition to reticles 521 and 721 (as shown in FIG. 4).

It is also understood that the positions of the semiconductor laser and the avalanche photodiode can be exchanged.

It is also understood that the avalanche photodiode can be replaced with a photodiode.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A binoculars rangefinder, comprising:
a central shaft;
two eyepieces disposed on two sides of the central shaft, allowing a first light beam reflected by an object to pass therethrough;
two objective lenses disposed on the two sides of the central shaft;
two prism modules disposed between the eyepieces and objective lenses;
an optical transmitter configured to emit a second light beam to the object; and
an optical receiver configured to receive the second light beam which is reflected by the object,
wherein each of the prism modules comprises a first prism, a second prism, a third prism and an optical multi-layer film disposed between the first prism and the second prism,
wherein the optical multi-layer film allows the second light beam to pass therethrough and reflects the first light beam,
wherein when entering the first prism along a first axis, the first light beam is totally reflected by the first prism and reflected by the optical multi-layer film, leaves the first prism, enters the third prism, is totally reflected by the third prism, and leaves the third prism along the first axis;
wherein when entering the first prism along the first axis, the second light beam is totally reflected by the first prism, leaves the first prism, passes through the optical multi-layer film, enters the second prism, is totally reflected by the second prism, and leaves the second prism along a second axis.

2. The binoculars rangefinder as claimed in claim 1, wherein the third prism is a roof prism.

3. The binoculars rangefinder as claimed in claim 1, wherein the first prism comprises a first surface, a second surface and a third surface; the second prism comprises a fourth surface, a fifth surface facing the third surface and a sixth surface; the third prism comprises a seventh surface facing the second surface, an eighth surface, a first roof surface and a second roof surface, and the optical multi-layer film is disposed between the third surface and the fifth surface.

4. The binoculars rangefinder as claimed in claim 3, wherein the third surface is attached to the fifth surface by adhesive.

5. The binoculars rangefinder as claimed in claim 1, wherein the first light beam is visible light, and the second light beam is an infrared ray.

6. The binoculars rangefinder as claimed in claim 1, wherein the optical transmitter comprises a semiconductor laser, and the optical receiver comprises an avalanche photodiode or a photodiode.

7. The binoculars rangefinder as claimed in claim 1 further comprising two transmissive liquid crystal displays disposed between the eyepieces and the prism modules.

8. The binoculars rangefinder as claimed in claim 1 further comprises two organic light emitting diodes disposed between the eyepieces and the prism modules.

9. The binoculars rangefinder as claimed in claim 1 further comprises two flat glass plates disposed between the eyepieces and the prism modules.

10. The binoculars rangefinder as claimed in claim 1 further comprises two focusing lenses disposed between the eyepieces and the prism modules.

* * * * *